US010836115B2

(12) United States Patent
Vansickel et al.

(10) Patent No.: US 10,836,115 B2
(45) Date of Patent: Nov. 17, 2020

(54) MAT ROLLER

(71) Applicant: Audio Accessories Group, LLC, Tempe, AZ (US)

(72) Inventors: Larry Vansickel, Phoenix, AZ (US); Wang Hai, Ningbo (CN); Wang You Cai, Ningbo (CN)

( * ) Notice: Subject to any disclaimer, the term of this patent is extended or adjusted under 35 U.S.C. 154(b) by 126 days.

(21) Appl. No.: 15/837,266

(22) Filed: Dec. 11, 2017

(65) Prior Publication Data

US 2019/0176409 A1    Jun. 13, 2019

(51) Int. Cl.
| | |
|---|---|
| B25B 27/00 | (2006.01) |
| B25G 1/00 | (2006.01) |
| B29C 65/52 | (2006.01) |
| F16C 13/00 | (2006.01) |
| B29C 65/00 | (2006.01) |
| B29C 63/00 | (2006.01) |

(Continued)

(52) U.S. Cl.
CPC .... B29C 66/83415 (2013.01); B25B 27/0092 (2013.01); B25G 1/00 (2013.01); B29C 65/52 (2013.01); F16C 13/00 (2013.01); *B29C 63/0073* (2013.01); *B29C 63/30* (2013.01); *B29K 2995/0002* (2013.01); *B29L 2031/3014* (2013.01); *B60J 5/0418* (2013.01)

(58) Field of Classification Search
CPC .............. B29C 66/83415; B29C 65/52; B29C 65/48–548; B29C 66/8362; B29C 66/861; B29C 66/8618; F16C 13/00; B60J 5/0418; B05C 17/02–04; A47G 27/0487; B29L 2031/283; B41K 1/00–58
See application file for complete search history.

(56) References Cited

U.S. PATENT DOCUMENTS

| 519,919 | A | * | 5/1894 | Maurer | B28B 11/0809 404/124 |
|---|---|---|---|---|---|
| D36,788 | S | * | 2/1904 | Alves | D15/20 |

(Continued)

FOREIGN PATENT DOCUMENTS

| JP | 57180675 A | * | 11/1982 | ......... B29C 65/7437 |
|---|---|---|---|---|
| JP | 61182927 A | * | 8/1986 | |

OTHER PUBLICATIONS

Flashaholic, "Beginner's Guide to explain simple LED flashlight." May 23, 2013, www.candlepowerforums.com, 14 pages (Year: 2013).*

(Continued)

*Primary Examiner* — Jacob J Cigna
(74) *Attorney, Agent, or Firm* — Keith L. Jenkins, Registered Patent Attorney LLC; Keith L. Jenkins

(57) ABSTRACT

A handle supporting a mat roller head at an angle to the handle to make applying force to the adhesive acoustic damping mat easier in tight spaces. The angle is optionally adjustable. The roller head includes arms supporting a roller with a two-dimensionally corrugated surface to enable applying adhesive acoustic damping mats to irregular surfaces. Additionally, the roller head supports two LEDs to improve visibility of the workspace when adhesive acoustic damping mats are being applied. Power for the LEDs comes from batteries in a battery compartment in the handle. The screw-on battery compartment cap includes an ON/OFF switch. The handle has a top thumb rest and a bottom finger rest and has a partial tactile engagement surface.

19 Claims, 7 Drawing Sheets

(51) Int. Cl.
  *B29C 63/30* (2006.01)
  *B29L 31/30* (2006.01)
  *B60J 5/04* (2006.01)

(56) References Cited

U.S. PATENT DOCUMENTS

| | | | | |
|---|---|---|---|---|
| 1,404,417 | A * | 1/1922 | Wolfe | B41K 1/22 |
| | | | | 101/329 |
| 1,819,375 | A * | 8/1931 | Matthews | B41K 3/38 |
| | | | | 101/26 |
| 2,430,920 | A * | 11/1947 | Dodge | B29C 66/8362 |
| | | | | 156/182 |
| 2,598,900 | A * | 6/1952 | Frye | B29C 65/18 |
| | | | | 219/237 |
| D186,044 | S * | 9/1959 | Hauser | D7/694 |
| 3,098,783 | A * | 7/1963 | Busch | E04F 21/22 |
| | | | | 156/579 |
| 3,611,528 | A * | 10/1971 | Lance | B44C 3/08 |
| | | | | 156/579 |
| 3,736,199 | A * | 5/1973 | Mason | B60R 13/04 |
| | | | | 156/579 |
| 3,857,015 | A * | 12/1974 | Clark | B29C 65/18 |
| | | | | 156/579 |
| D252,180 | S * | 6/1979 | Zuber | D24/211 |
| D253,155 | S * | 10/1979 | Jurida | D24/211 |
| 4,224,726 | A * | 9/1980 | Walker | A47G 27/0487 |
| | | | | 492/13 |
| 4,439,904 | A * | 4/1984 | Hoopengardner | A47G 27/0487 |
| | | | | 156/304.7 |
| 4,894,112 | A * | 1/1990 | Lippman | B29C 66/1122 |
| | | | | 156/308.4 |
| 5,123,768 | A * | 6/1992 | Franklin | A46B 5/0075 |
| | | | | 403/84 |
| 5,207,755 | A * | 5/1993 | Ampian | A46B 5/0075 |
| | | | | 15/144.1 |
| D365,971 | S * | 1/1996 | Brockmann | D7/682 |
| D402,513 | S * | 12/1998 | Goodrich | D8/15 |
| 6,049,970 | A * | 4/2000 | Reis | B29C 65/562 |
| | | | | 29/798 |
| 6,685,609 | B2 * | 2/2004 | Carder | A47G 27/0487 |
| | | | | 492/13 |
| 7,588,523 | B2 * | 9/2009 | Horner | B29C 65/10 |
| | | | | 15/230.11 |
| 9,358,376 | B2 * | 6/2016 | Altarac | A61M 37/0015 |
| 2003/0009840 | A1 * | 1/2003 | Karsten | B05C 17/022 |
| | | | | 15/230.11 |
| 2006/0123578 | A1 * | 6/2006 | Rickstrew | B05C 17/022 |
| | | | | 15/230.11 |
| 2011/0040236 | A1 * | 2/2011 | Isaacs | A61L 2/025 |
| | | | | 604/20 |
| 2013/0312909 | A1 * | 11/2013 | Thurston | E04D 15/04 |
| | | | | 156/306.3 |
| 2014/0027037 | A1 * | 1/2014 | Calman | B32B 37/10 |
| | | | | 156/60 |
| 2015/0231382 | A1 * | 8/2015 | Altarac | A61M 37/0015 |
| | | | | 604/47 |
| 2015/0251210 | A1 * | 9/2015 | Surratt | B05C 17/0245 |
| | | | | 15/105 |

OTHER PUBLICATIONS

Fox, Mem, and Helen Oxenbury. Ten Little Fingers and Ten Little Toes. Boston: HMH Books, 2008. (Year: 2008).*

Uxcell® Car Sound Deadener Application Rolling Wheel Roller; https://www.amazon.com/uxcell%C2%AE-Deadener-Application-Rolling-Roller/dp/B00GMOI98S/ref=sr_1_3?ie=UTF8&qid=1512862760&sr=8-3&keywords=mat+roller.

* cited by examiner

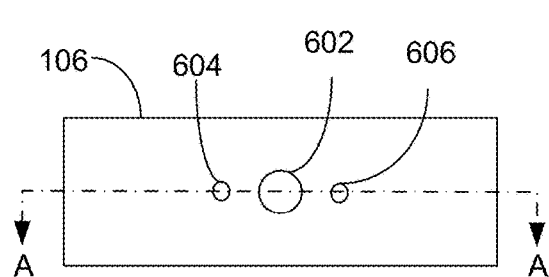
FIG. 6
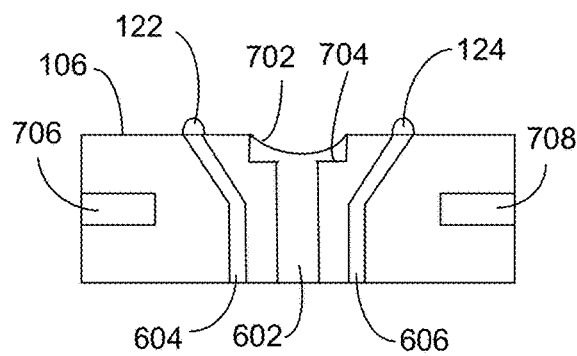
FIG. 7
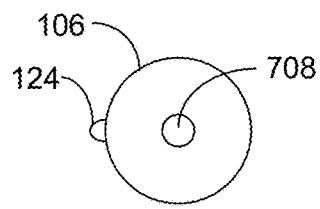
FIG. 8
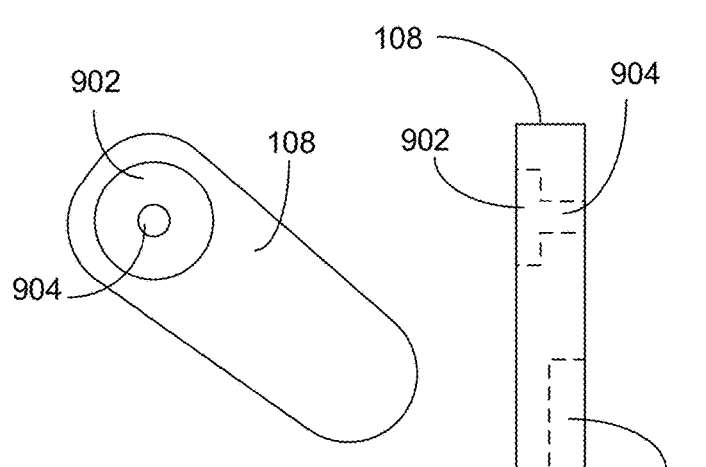
FIG. 9
FIG. 10
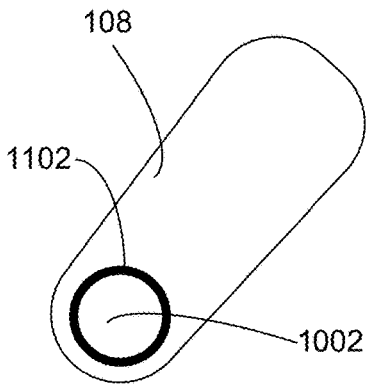
FIG. 11

MAT ROLLER

FIELD OF ART

The present invention relates to rollers for applying adhesive mats to irregular surfaces. The present invention more particularly relates to rollers for applying adhesive acoustic damping mats to the interior surfaces of car doors.

BACKGROUND OF THE INVENTION

Acoustic damping mats are used to control unwanted vibrations from automobile door panels where loudspeakers are installed in such automobile doors. There are additional uses for acoustic damping mats, as well. Adhesive acoustic damping mats are applied to interior surfaces of car doors during car door loudspeaker installations. Mat rollers are conventionally used for applying adhesive acoustic damping mats to inner door panel surfaces. Conventional mat rollers are difficult to use in the tight spaces inside car doors were the adhesive acoustic damping mats must be applied. What is needed is a mat roller that can be more easily used in such tight spaces and which can adapt the adhesive acoustic damping mat to irregular surfaces.

SUMMARY OF THE INVENTION

Briefly described, the invention includes a handle supporting a mat roller head at an angle to the handle to make applying force to the adhesive acoustic damping mat easier in tight spaces. The roller head includes arms supporting a roller with a two-dimensionally corrugated surface to enable applying adhesive mats to irregular surfaces. Additionally, the roller head supports two LEDs to improve visibility of the workspace when adhesive acoustic damping mats are being applied.

DESCRIPTION OF THE FIGURES OF THE DRAWINGS

The present invention will hereinafter be described in conjunction with the following drawing figures, wherein like numerals denote like elements.

FIG. 6 is a rear elevation view illustrating an exemplary barrel of the exemplary embodiment of the mat roller of FIG. 1 and defining cross section AA, according to a preferred embodiment of the present invention;

FIG. 7 is a top cross sectional view through cross section AA illustrating an exemplary barrel of the exemplary embodiment of the mat roller of FIG. 1, according to a preferred embodiment of the present invention;

FIG. 8 is an end view illustrating the exemplary barrel of the exemplary embodiment of the mat roller of FIG. 1, according to a preferred embodiment of the present invention;

FIG. 9 is an outside side elevation view illustrating an exemplary roller support arm of the exemplary embodiment of the mat roller of FIG. 1, according to a preferred embodiment of the present invention;

FIG. 10 is a side elevation x-ray view illustrating the exemplary roller support arm of the exemplary embodiment of the mat roller of FIG. 1, according to a preferred embodiment of the present invention; and FIG. 11 is an inside side elevation view illustrating an exemplary roller support arm of the exemplary embodiment of the mat roller of FIG. 1, according to a preferred embodiment of the present invention;

DETAILED DESCRIPTION OF THE INVENTION

Figure 1:
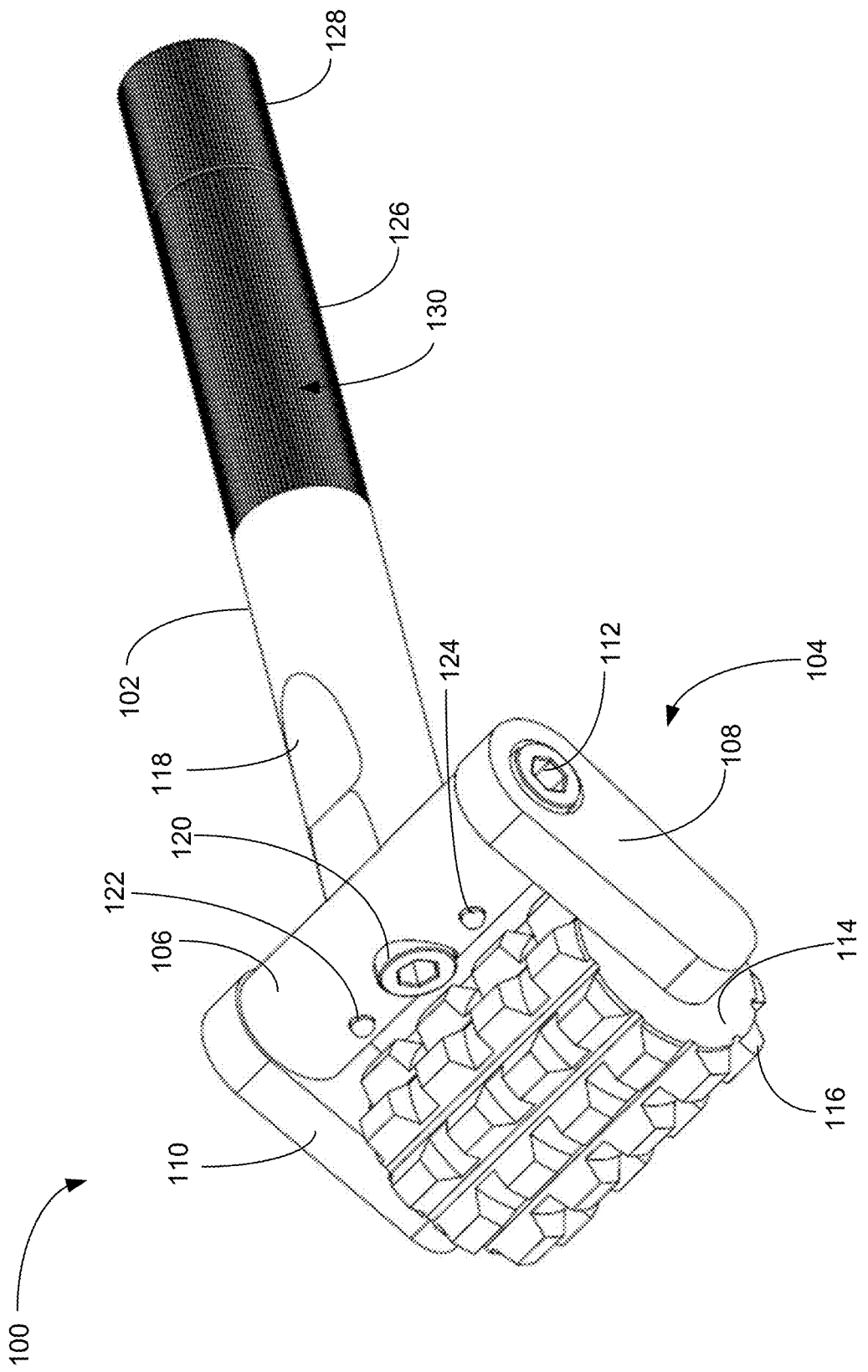
FIG. 1 is a top-front perspective view illustrating an exemplary embodiment of the mat roller, according to a preferred embodiment of the present invention.

FIG. 1 is a top-front perspective view illustrating an exemplary embodiment of the mat roller 100, according to a preferred embodiment of the present invention. Mat roller 100 includes a handle 102 attached, via screw 120, to a roller head 104. Handle 102 is preferably hollow to provide a battery compartment to receive batteries to power LEDs 122 and 124. The battery compartment is accessed by removing screw cap 128. LEDs 122 and 124 provide the advantage of improving visibility of the workspace during operations. Screw cap 128 and lower handle 126 have a tactile engaging surface 130. Handle 102 also has a scalloped thumb rest 118. Roller head 104 includes a barrel 106 which has a bore for receiving screw 120 and which supports two LEDs 122 and 124. Barrel 106 is fixed to handle 102 by screw 120. Roller support arms 108 and 110 are fastened to barrel 106 via arm screws 112 and 202 (see FIG. 2). Roller support arms 108 and 110 extend from opposing ends of barrel 106 to support roller 114 which freely rotates on axles received by axle receivers 1002 (see FIG. 10) in roller support arms 108 and 110, as shown. The surface of roller 114 has a two-dimensional array of corrugated protrusions 116 (one of forty labeled) that have the advantage of assisting in applying an adhesive acoustic damping mat to an irregular surface.

Figure 2:
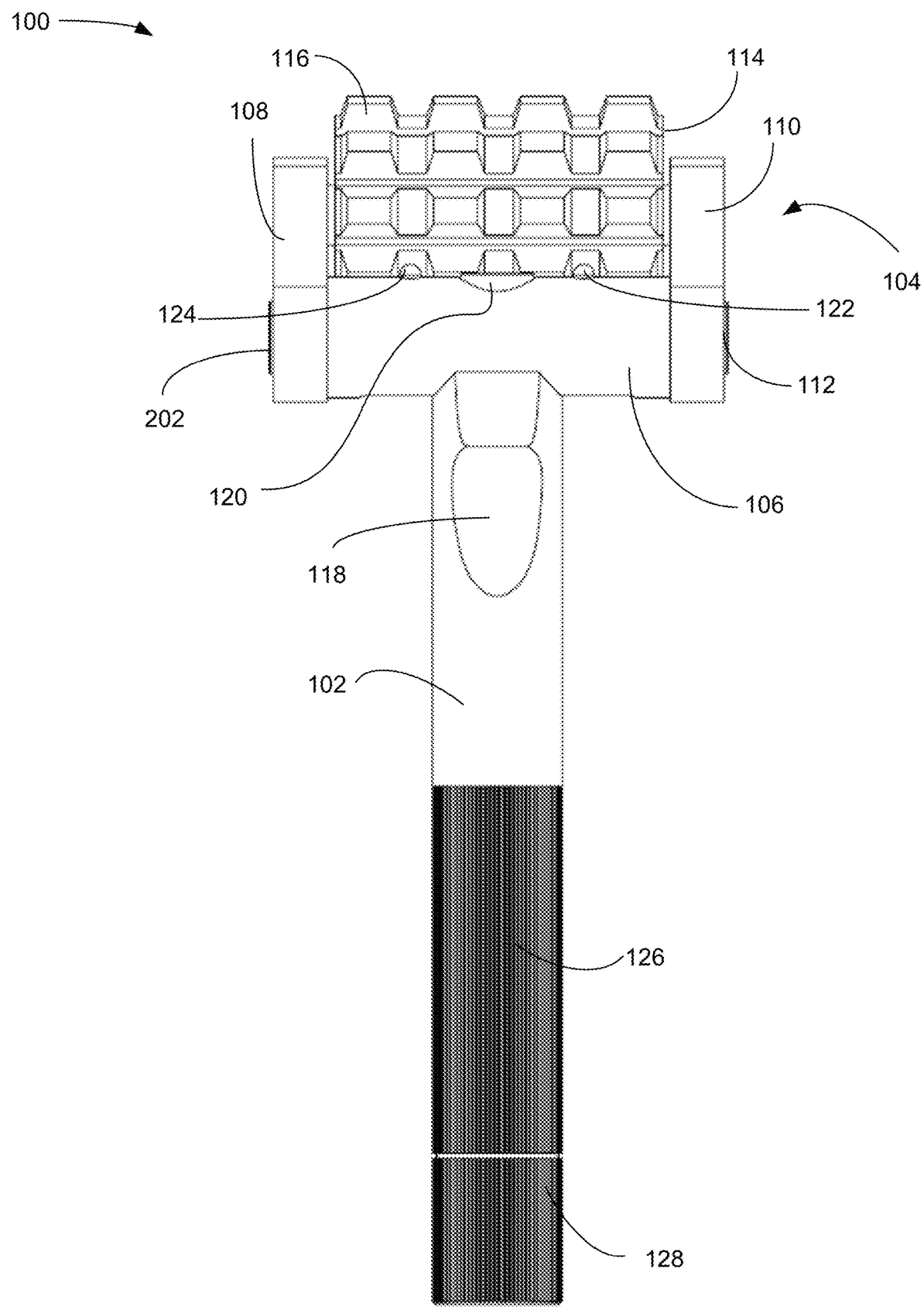
FIG. 2 is a top plan view illustrating the exemplary embodiment of the mat roller of FIG. 1, according to a preferred embodiment of the present invention.

FIG. 2 is a top plan view illustrating the exemplary embodiment of the mat roller 100 of FIG. 1, according to a preferred embodiment of the present invention. Barrel 106 is attached transversely to handle 102 and is prevented from rotation or translation relative to handle 102 by screw 120. Wires from battery contacts inside handle 102 lead though electrical conduits 604 and 606 (see FIG. 6) of barrel 106 to the LEDs 122 and 124, respectively. The LED electrical connections are mundane and so not illustrated here.

Figure 3:
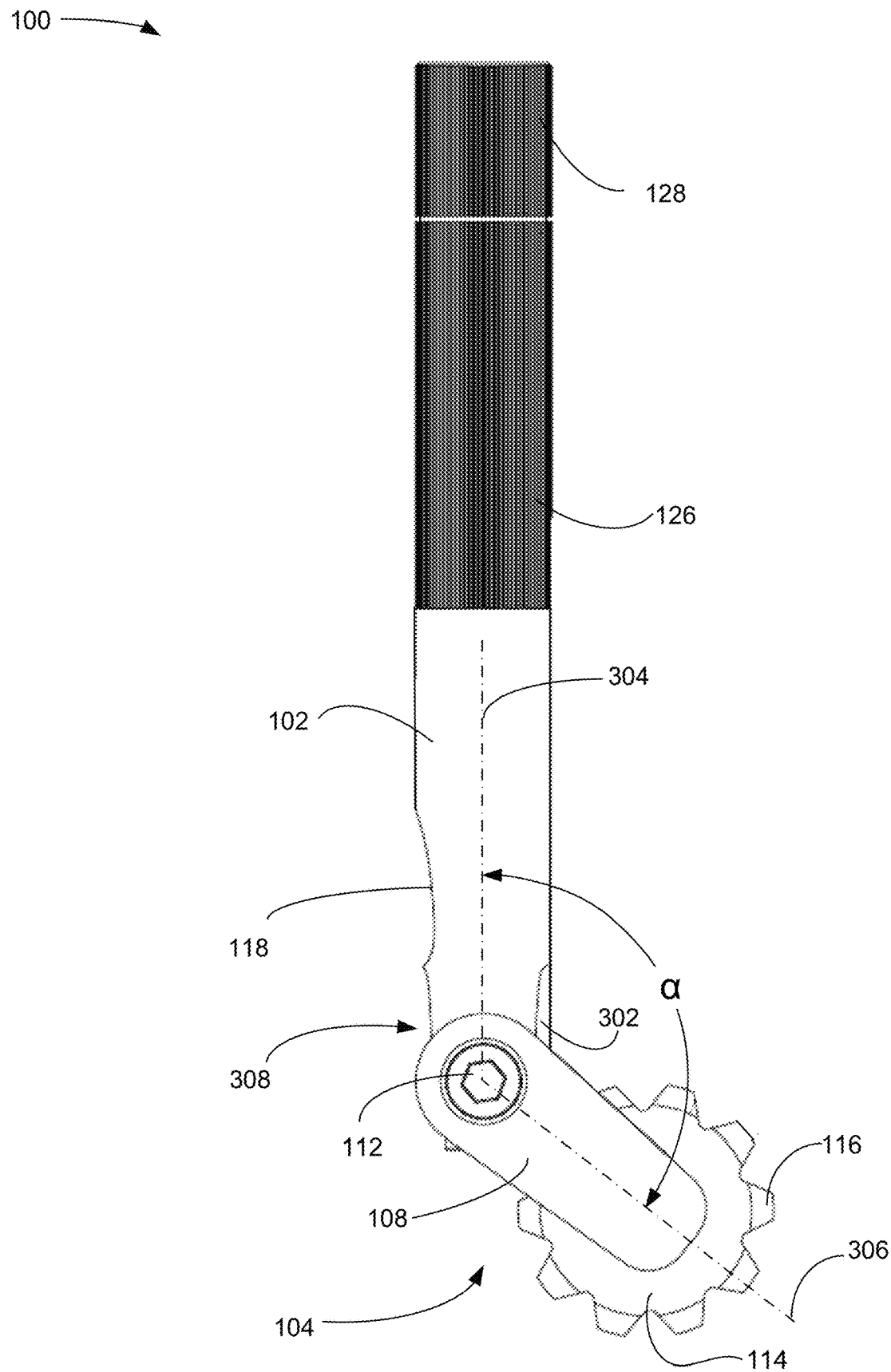
FIG. 3 is a side elevation view illustrating the exemplary embodiment of the mat roller of FIG. 1, according to a preferred embodiment of the present invention.

FIG. 3 is a side elevation view illustrating the exemplary embodiment of the mat roller 100 of FIG. 1, according to a preferred embodiment of the present invention. Handle 102 has a concave arcuate front end 308 that conforms to the curvature of barrel 106. The bottom of handle 102 has a scalloped finger rest 302. The centerline 306 of the roller support arm 108 makes an angle α with the centerline 304 of the handle 102. Preferably α is 142+/−2 degrees. In various other embodiments, other angles α may be used. In additional embodiments, the angle α is preferably adjustable by loosening screw 122, adjusting the angle α by rotating roller support arm 108, and then retightening screw 112. Of course, the same adjustment must be made for roller support arm 110 using screw 202.

Figure 4:
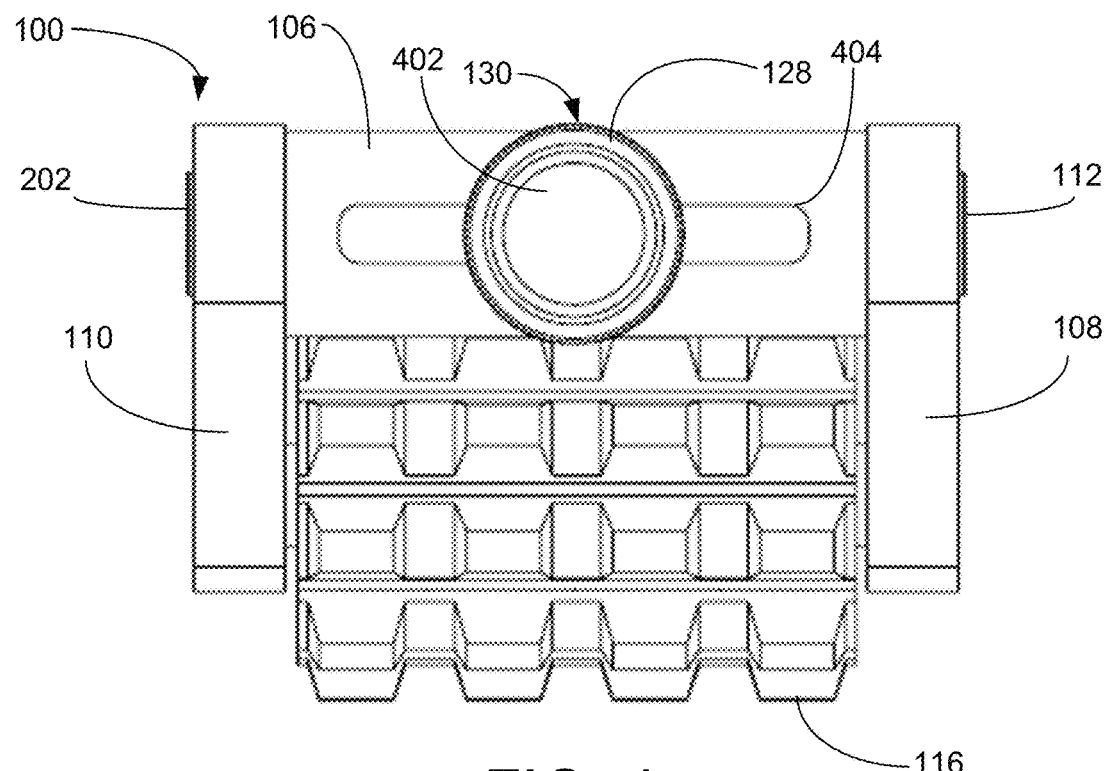
FIG. 4 is a rear elevation view illustrating the exemplary embodiment of the mat roller of FIG. 1, according to a preferred embodiment of the present invention.

FIG. 4 is a rear elevation view illustrating the exemplary embodiment of the mat roller 100 of FIG. 1, according to a preferred embodiment of the present invention. Roller protrusions 116 extend below the ends of roller support arms 108 and 110. Push button ON/OFF switch 402 is preferably located in the screw cap 128. In various embodiments, various ON/OFF switch 402 types may be used. In various embodiments, ON/OFF switch 402 may be positioned on the handle 102. Preferably, the corrugated protrusions 116 are arranged as ten rows around the roller 114 and four columns across the roller 114. In various other embodiments various numbers of rows and columns may be used.

Figure 5:
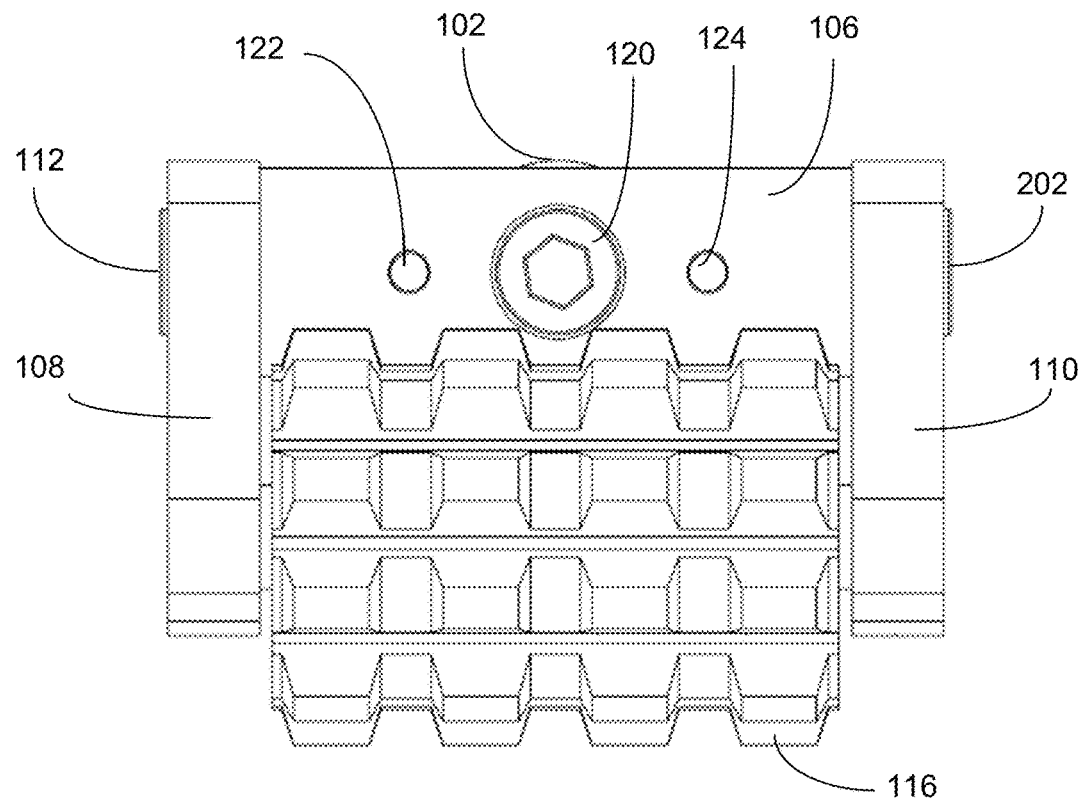
FIG. 5 is a front elevation view illustrating the exemplary embodiment of the mat roller of FIG. 1, according to a preferred embodiment of the present invention.

FIG. 5 is a front elevation view illustrating the exemplary embodiment of the mat roller 100 of FIG. 1, according to a preferred embodiment of the present invention. In a particular embodiment, there may be more than the preferred two LEDs 122 and 124. Preferably, LEDs 122 and 124 are white light LEDs. In various embodiments, various colors of LEDs may be used.

FIG. 6 is a rear elevation view illustrating an exemplary barrel 106 of the exemplary embodiment of the mat roller 100 of FIG. 1 and defining cross section AA, according to a preferred embodiment of the present invention. The surface shown receives the conformal arcuate concave end 308 of the handle 102, which has a screw receiver aligned to bore 602. Electrical conduits 604 and 606 conduct electrical power wires to LEDs 122 and 124, respectively.

FIG. 7 is a top cross sectional view through cross section AA illustrating an exemplary barrel 106 of the exemplary embodiment of the mat roller 100 of FIG. 1, according to a preferred embodiment of the present invention. Bore 602 extends through barrel 106 to countersink 704 that creates an arcuate rim 702 on the front surface of barrel 106. Electrical conduits 604 and 606 lead to LEDs 122 and 124, respectively. The illustrated path of electrical conduits 604 and 606 is not a limitation of the present invention. Roller support arm screw receivers 706 and 708 receive the screws 202 and 112, respectively, that hold the roller support arms 108 and 110, respectively, to opposed ends of the barrel 106.

FIG. 8 is an end view illustrating the exemplary barrel 106 of the exemplary embodiment of the mat roller 100 of FIG. 1, according to a preferred embodiment of the present invention. Roller support arm screw receiver 708 is centrally located on the end of barrel 106. The opposite end of barrel 106 is similarly configured.

FIG. 9 is an outside side elevation view illustrating an exemplary roller support arm 108 of the exemplary embodiment of the mat roller 100 of FIG. 1, according to a preferred embodiment of the present invention. Countersink 902 receives a head of screw 112 which has a threaded portion that extends through bore 904 and, during assembly, into bore 708 of barrel 106. Roller support arm 110 is similarly configured.

FIG. 10 is a side elevation x-ray view illustrating the exemplary roller support arm 108 of the exemplary embodiment of the mat roller 100 of FIG. 1, according to a preferred embodiment of the present invention. Roller axle receiver 1002 does not extend through roller support arm 108. Roller support arm 110 is similarly configured.

FIG. 11 is an inside side elevation view illustrating an exemplary roller support arm of the exemplary embodiment of the mat roller of FIG. 1, according to a preferred embodiment of the present invention. Roller axle receiver 1002 preferably houses a bearing 1102 to enable easy rotation of the roller 114 when in use. Roller support arm 110 is similarly configured.

Figure 12:
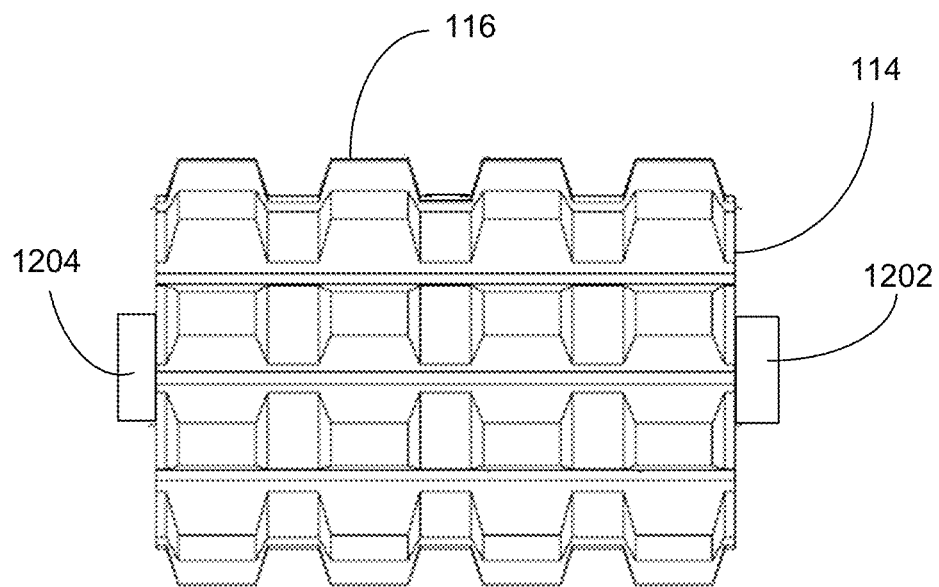
FIG. 12 is a front perspective view illustrating an exemplary roller of the exemplary embodiment of the mat roller of FIG. 1, according to a preferred embodiment of the present invention.

FIG. 12 is a front perspective view illustrating an exemplary roller 114 of the exemplary embodiment of the mat roller 100 of FIG. 1, according to a preferred embodiment of the present invention. Roller axle ends 1202 and 1204 are visible in this view. In a particular embodiment, axle ends 1202 and 1204 may be ends of a single axle rigidly fixed to roller 114. In another particular embodiment, axle ends 1202 and 1204 may be ends of a single axle that rotates on bearings within roller 114. In yet another particular embodiment, axle ends 1202 and 1204 may be fixed protrusions from roller 114 that rotate on bearings 1102 in roller support arm axle receivers 1002. The four columns of corrugated protrusions 116 can be seen in this view.

Figure 13:
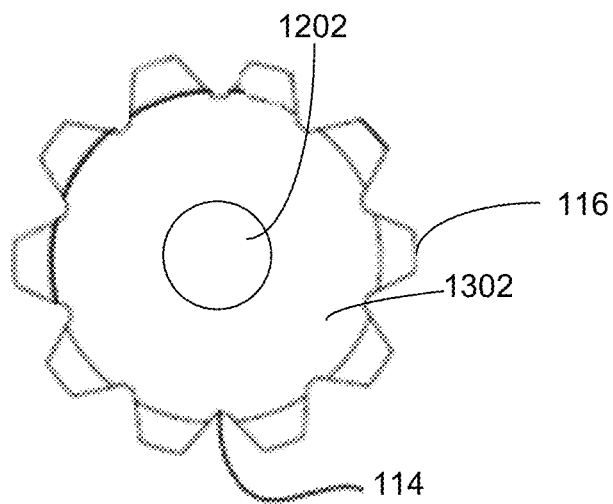
FIG. 13 is an end elevation view illustrating an exemplary roller of the exemplary embodiment of the mat roller of FIG. 1, according to a preferred embodiment of the present invention.

FIG. 13 is an end elevation view illustrating an exemplary roller 114 of the exemplary embodiment of the mat roller 100 of FIG. 1, according to a preferred embodiment of the present invention. Axle end 1202 is centrally located on the end plate 1302 of roller 114. The ten rows of corrugated protrusions 116 can be seen in this view.

Figure 14:
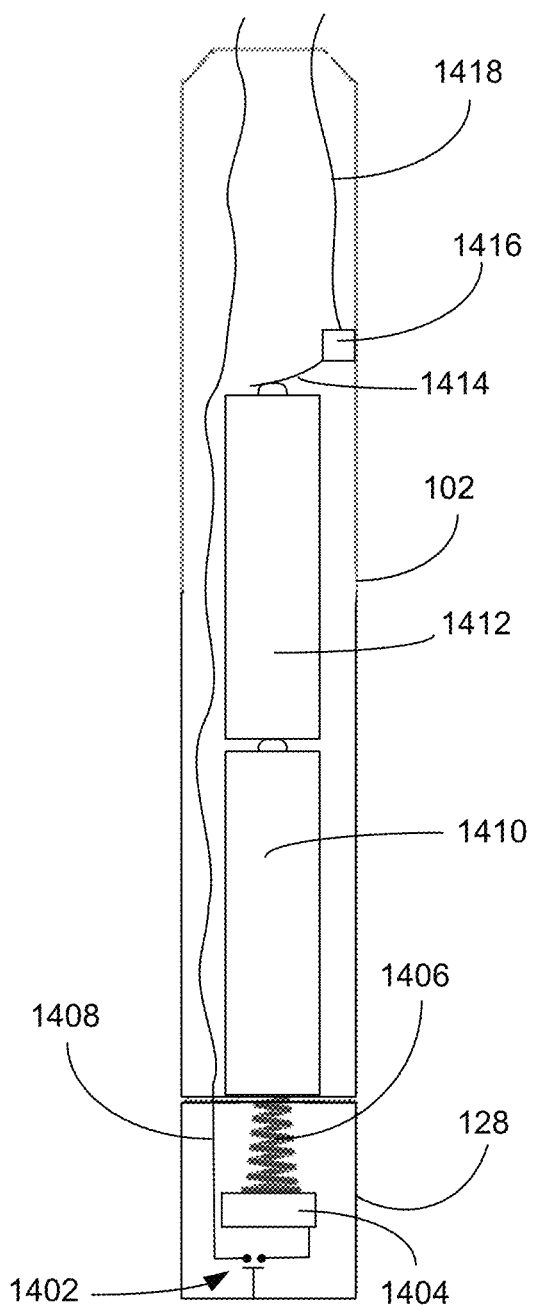
FIG. 14 is a top plan diagrammatic view illustrating an exemplary handle of the exemplary embodiment of the mat roller of FIG. 1, according to a preferred embodiment of the present invention.

FIG. 14 is a top plan diagrammatic view illustrating an exemplary handle 102 of the exemplary embodiment of the mat roller 100 of FIG. 1, according to a preferred embodiment of the present invention. Hollow handle 102 contains a battery compartment enclosing two AA batteries 1410 and 1412 with a coil spring electrical contact 1406 mounted on a conductive support 1404 and a reed spring contact 1414 mounted on a conductive support 1416. Conductive support 1404 connects wire 1408 to pushbutton toggle switch 1402. Wires 1408 and 1418 conduct power to the LEDs 122 and 124.

We claim:
1. A mat roller comprising:
   a. a handle;
   b. a roller head fixed to a first end of said handle; and
   c. a roller mounted in said roller head and having a surface comprising a plurality of two-dimensionally corrugated protrusions;
   d. wherein each said protrusion of said plurality of protrusions has a radially outward polygonal surface portion operable to compress said mat;
   e. a hollow battery compartment supporting two electrical contacts in said handle; and
   f. a screw cap closure for a second end of said handle.
2. The mat roller of claim 1 wherein said screw cap comprises an ON/OFF switch.
3. The mat roller of claim 1, wherein at least a portion of said handle and a portion of said screw cap comprises a tactile engagement surface texture.
4. The mat roller of claim 1, where said handle comprises:
   a. a scalloped thumb rest on a top of said handle; and
   b. a scalloped finger rest on a bottom of said handle.
5. The mat roller of claim 1, wherein said roller head comprises:
   a. a barrel fixed transversely to said handle;

b. first and second roller support arms releasably fastened transversely to respectively opposed ends of said barrel at respective first ends of said first and second roller support arms;

c. first and second roller axle receivers in respective distal second ends of said respective first and second roller support arms.

6. The mat roller of claim 5, comprising:

a. at least two LEDs mounted on said barrel; and b. at least two electrical connections between respective said at least two LEDs and first and second electrical contacts in said battery compartment.

7. The mat roller of claim 5, comprising an angle between parallel first and second centerlines of said first and second roller support arms and a centerline of said handle.

8. The mat roller of claim 7, wherein said angle is 142°+/−2°.

9. The mat roller of claim 7, wherein said angle is adjustable.

10. A mat roller comprising:

a. a handle;

b. a roller head fixed to a first end of said handle; and c. a roller mounted in said roller head and having a surface comprising a plurality of two-dimensionally corrugated protrusions;

d. wherein each said protrusion of said plurality of protrusions has a radially outward polygonal surface portion operable to compress said mat; and e. wherein said roller head comprises:

i. a barrel fixed transversely to said handle;

ii. first and second roller support arms releasably fastened transversely to respective opposed ends of said barrel at respective first ends of said first and second roller support arms; and iii. first and second roller axle receivers in respective distal second ends of said respective first and second roller support arms.

11. The mat roller of claim 10, where said handle comprises:

a. a scalloped thumb rest on a top of said handle; and b. a scalloped finger rest on a bottom of said handle.

12. The mat roller of claim 10, comprising an angle between a centerline of said first and second roller support arms and a centerline of said handle.

13. The mat roller of claim 12, wherein said angle is one of:

a. 142°+/−2°; and b. adjustable.

14. The mat roller of claim 10, comprising:

a. at least two LEDs mounted on said barrel;

b. a hollow battery compartment supporting two electrical contacts in said handle;

c. a screw cap closure for a second end of said handle; and d. wherein said screw cap comprises an ON/OFF switch.

15. The mat roller of claim 14, comprising at least two electrical connections between respective said at least two LEDs and first and second electrical contacts in said battery compartment.

16. The mat roller of claim 14, wherein at least a portion of said handle and a portion of said screw cap comprises a tactile engagement surface texture.

17. A mat roller comprising:

a. a handle;

b. a hollow battery compartment supporting two electrical contacts in said handle;

c. a roller head fixed to a first end of said handle; and d. a roller mounted in said roller head and having a surface comprising a plurality of two-dimensionally corrugated protrusions;

e. wherein each said protrusion of said plurality of protrusions has a radially outward polygonal surface portion operable to compress said mat;

f. wherein said roller head comprises:

i. a barrel fixed transversely to said handle;

ii. first and second roller support arms releasably fastened transversely to respective opposed ends of said barrel at respective first ends of said first and second roller support arms;

iii. first and second roller axle receivers in respective distal second ends of said respective first and second roller support arms;

g. an angle between first and second parallel centerlines of said first and second roller support arms and a centerline of said handle; and h. wherein said angle is one of:

iv. 142°+/−2°; and v. adjustable.

18. The mat roller of claim 17, comprising:

a. at least two LEDs mounted on said barrel; and b. at least two electrical connections between respective said at least two LEDs and first and second electrical contacts in said battery compartment.

19. The mat roller of claim 17, comprising:

a. a screw cap closure for a second end of said handle;

b. wherein said screw cap comprises an ON/OFF switch; and c. wherein at least a portion of said handle comprises:

i. a tactile engagement surface texture;

ii. a scalloped thumb rest on a top of said handle; and iii. a scalloped finger rest on a bottom of said handle.

* * * * *